US007552450B1

(12) United States Patent
Evans et al.

(10) Patent No.: US 7,552,450 B1
(45) Date of Patent: Jun. 23, 2009

(54) SYSTEMS AND METHODS FOR ENABLING APPLICATIONS VIA AN APPLICATION PROGRAMMING INTERFACE (API) TO INTERFACE WITH AND CONFIGURE DIGITAL MEDIA COMPONENTS

(75) Inventors: Glenn F. Evans, Kirkland, WA (US); William R. Messmer, Woodinville, WA (US); Matthijs A. Gates, Wellesley, MA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 10/676,722

(22) Filed: Sep. 30, 2003

(51) Int. Cl.
*G06F 3/00* (2006.01)
*H04N 7/00* (2006.01)
*G06F 17/30* (2006.01)
*H04N 7/16* (2006.01)

(52) U.S. Cl. .............................. 719/328; 386/98; 707/3; 725/145

(58) Field of Classification Search ............... 707/1–10, 707/104.1; 709/231; 725/86, 105, 135, 143, 725/145; 719/328; 386/98, 124
See application file for complete search history.

(56) References Cited

U.S. PATENT DOCUMENTS

| 5,687,367 | A | | 11/1997 | Dockter et al. |
| 5,903,652 | A | | 5/1999 | Mital |
| 5,983,190 | A | | 11/1999 | Trower, II et al. |
| 6,044,408 | A | * | 3/2000 | Engstrom et al. ............ 719/328 |
| 6,059,838 | A | | 5/2000 | Fraley et al. |
| 6,078,743 | A | | 6/2000 | Apte et al. |
| 6,101,510 | A | | 8/2000 | Stone et al. |
| 6,121,981 | A | | 9/2000 | Trower, II et al. |
| 6,182,109 | B1 | | 1/2001 | Sharma et al. |
| 6,185,625 | B1 | * | 2/2001 | Tso et al. ..................... 709/247 |
| 6,256,772 | B1 | | 7/2001 | Apte et al. |
| 6,263,492 | B1 | | 7/2001 | Fraley et al. |
| 6,279,030 | B1 | | 8/2001 | Britton et al. |
| 6,289,390 | B1 | | 9/2001 | Kavner |
| 6,289,395 | B1 | | 9/2001 | Apte et al. |
| 6,295,556 | B1 | | 9/2001 | Falcon et al. |

(Continued)

OTHER PUBLICATIONS

"IEncoderAPI Interface," MSDN library, provided by Microsoft Corporation of Redmond, WA, available at <<http://msdn.microsoft.com/library/default.asp?url=/library/en-us/directshow/htm/iencoderapiinterface.asp>>, accessed on Nov. 9, 2005, 2 pages.

(Continued)

*Primary Examiner*—Meng-Ai An
*Assistant Examiner*—Charles E Anya
(74) *Attorney, Agent, or Firm*—Lee & Hayes, PLLC

(57) ABSTRACT

Systems and methods for interfacing media components are disclosed. Information about the capabilities of digital media components registered with the system is stored in a capabilities register. In addition, a profile register that contains information about specific capabilities required to perform specific tasks is developed. An application that requires digital media services can select one or more profiles representative of the required service from the profile register. The profile can be mapped onto the capabilities register to locate one or more digital media components registered with system capable of performing operations required to provide the digital media services. The components can be instantiated and connected to build a device capable of providing the requested digital media service. Also disclosed is an Application Programming Interface (API) that enables applications to interface with digital media components from disparate third-party vendors.

32 Claims, 9 Drawing Sheets

U.S. PATENT DOCUMENTS

| | | | |
|---|---|---|---|
| 6,327,608 B1 | 12/2001 | Dillingham | |
| 6,369,821 B2 | 4/2002 | Merrill et al. | |
| 6,381,734 B1 | 4/2002 | Golde et al. | |
| 6,393,456 B1 | 5/2002 | Ambler et al. | |
| 6,401,099 B1 | 6/2002 | Koppolu et al. | |
| 6,434,740 B1 | 8/2002 | Monday et al. | |
| 6,460,029 B1 | 10/2002 | Fries et al. | |
| 6,470,378 B1 * | 10/2002 | Tracton et al. | 709/203 |
| 6,484,259 B1 | 11/2002 | Barlow | |
| 6,513,031 B1 | 1/2003 | Fries et al. | |
| 6,519,605 B1 | 2/2003 | Gilgen et al. | |
| 6,535,110 B1 | 3/2003 | Arora et al. | |
| 6,542,908 B1 | 4/2003 | Ims | |
| 6,564,270 B1 | 5/2003 | Andert et al. | |
| 6,581,102 B1 | 6/2003 | Amini et al. | |
| 6,594,699 B1 * | 7/2003 | Sahai et al. | 709/228 |
| 6,603,476 B1 | 8/2003 | Paolini et al. | |
| 6,604,196 B1 | 8/2003 | Monday et al. | |
| 6,606,642 B2 | 8/2003 | Ambler et al. | |
| 2002/0065952 A1 * | 5/2002 | Sullivan et al. | 709/328 |
| 2002/0075290 A1 | 6/2002 | Rajarajan et al. | |
| 2002/0087950 A1 | 7/2002 | Brodeur et al. | |
| 2002/0099876 A1 | 7/2002 | Bui et al. | |
| 2002/0112058 A1 | 8/2002 | Weisman et al. | |
| 2002/0116248 A1 | 8/2002 | Amit et al. | |
| 2002/0176366 A1 | 11/2002 | Ayyagari et al. | |
| 2002/0188941 A1 | 12/2002 | Cicciarelli et al. | |
| 2003/0004771 A1 | 1/2003 | Yaung | |
| 2003/0005110 A1 | 1/2003 | Corbin et al. | |
| 2003/0009553 A1 | 1/2003 | Benfield et al. | |
| 2003/0018964 A1 | 1/2003 | Fox et al. | |
| 2003/0023472 A1 | 1/2003 | Lee et al. | |
| 2003/0023662 A1 | 1/2003 | Yaung | |
| 2003/0023728 A1 | 1/2003 | Yaung | |
| 2003/0023773 A1 | 1/2003 | Lee et al. | |
| 2003/0028550 A1 | 2/2003 | Lee et al. | |
| 2003/0037327 A1 | 2/2003 | Cicciarelli et al. | |
| 2003/0037328 A1 | 2/2003 | Cicciarelli et al. | |
| 2003/0055948 A1 | 3/2003 | Wang | |
| 2003/0097458 A1 * | 5/2003 | Bourges-Sevenier | 709/231 |
| 2003/0101190 A1 | 5/2003 | Horvitz et al. | |
| 2004/0204073 A1 * | 10/2004 | Yanosy | 455/557 |

OTHER PUBLICATIONS

NVIDIA homepage, provided by NVIDIA Corporation of Santa Clara, CA, available at <<http://www.nvidia.com/page/home>>, accessed on Nov. 9, 2005, 2 pages.

CyberLink homepage, provided by CyberLink Corp. of Hsin-Tien City Taipei Hsien, Taiwan, R.O.C., available at <<http://www.cyberlink.com/>>, accessed on Nov. 9, 2005, 2 pages.

Sonic Solutions homepage, provided by Sonic Solutions, of Santa Clara, CA, available at <<http://www.sonic.com/about/default.aspx>>, accessed on Nov. 9, 2005, 2 pages.

U.S. Appl. No. 11/172,251, entitled "Strategies for Configuring Media Processing Functionality Using a Hierarchical Ordering of Control Parameters," filed Jun. 30, 2005, naming the inventors of Glenn F. Evans, Bruce W. Randall, and Stacey L. Spears.

* cited by examiner

SYSTEMS AND METHODS FOR ENABLING APPLICATIONS VIA AN APPLICATION PROGRAMMING INTERFACE (API) TO INTERFACE WITH AND CONFIGURE DIGITAL MEDIA COMPONENTS

TECHNICAL FIELD

The described subject matter relates to electronic computing, and more particularly to systems and methods for locating, configuring and interfacing media components.

BACKGROUND

Media content has traditionally been distributed using equipment and protocols that are application-specific, and in some cases proprietary. For example, video content has traditionally been encoded in an analog format and distributed over television networks, cable networks, satellite networks, and video cassette tapes. Special purpose capture and transmission devices are required to generate the content. Similarly, special purpose receivers and display devices are required to access the content.

The widespread digitization of media (including multimedia) content, especially by the consumer segment, coupled with the growth in digital communication networks and easier methods to transfer digital content is changing the nature of media content delivery and usage. Media content can now be captured and encoded in one or more of a plurality of digital formats (e.g., MPEG, Windows Media Format, VCD, etc.) distributed over digital networks such as the internet or on digital media and accessed using general purpose computing equipment or special purpose equipment.

Digital computing devices play a central role in digital media production, encoding, distribution, and display. Microsoft Corporation of Redmond, Wash., USA, has developed a set of technologies to facilitate the use of digital media and the integration of digital media processing components (both hardware and software) with personal computers. MICROSOFT DIRECTSHOW is a digital media streaming architecture designed for digital audio, video and other types of digital data. DIRECTSHOW provides a high-level application model that enables independent hardware vendors (IHVs) and independent software vendors (ISVs) to develop streaming media applications that combine and use components from possibly different vendors and run on computers using the WINDOWS brand operating system.

Additional infrastructure to facilitate the integration of digital media components is desirable to facilitate continued development in the digital media marketplace and to increase the flexibility that users and developers have to create innovative uses of those components.

SUMMARY

Implementations described herein provide an environment in which digital media processing components such as, e.g., encoders, decoders, demultiplexers, multiplexers, packetizers, can report information about their capabilities and expose standardized configuration interfaces to applications that might require the services of the components. In addition, standardized lists of configuration parameters, capability requirements and configuration semantics (collectively referred to as 'profiles') can be provided to applications to aid in the automation of discovering and configuring of such components to perform common user tasks. The profile facility removes the need for task-specific knowledge to be embedded in applications. The profile information can also be updated or corrected without the need to modify every application which uses the profile.

For example, if an application would like to perform a task (e.g. 'DVD media encoding'), it could look up the profile for the task (e.g. 'DVD encoding') and use the contents of the profile to find out what components need to do to perform the task (e.g., 'DVD encoding') and how to configure the components to perform the task (e.g., 'DVD encoding'). The application does not need to know the specifics of the task to accomplish it. It only requires an indication to which profile to use (i.e., either a built in reference or it may request the user to select a profile). At a later point in time, a problem discovered in the profile may be corrected without requiring every application performing the task (e.g., 'DVD encoding') to be modified.

In operation, an application in need of digital media services can search a register of profiles and a register database of digital media components installed on a particular computing device (referred to as the 'component register'). The component register can be searched without instantiating (i.e., 'opening') a device. Each entry in the component register may contain additional information describing a component's capabilities (referred to as the component's 'capability list'). The component register and each of the component's capability lists can be used to determine whether the services indicated in the profile are available from installed digital media components. Also provided is an Application Programming Interface (API) that enables applications to interface with and configure digital media components from disparate third-party vendors. In an exemplary implementation, a method of selecting at least one digital media component to construct a device that accomplishes one or more tasks identified in a profile is provided. The method comprises retrieving, from the profile, at least one required capability for performing the selected task, selecting, from a component register, one or more component entries with capability lists that include the required capability, and instantiating one or more components corresponding to the selected entries.

In another exemplary implementation, an apparatus comprises a processor and a memory module connected to the processor. The memory module comprises logic instructions (e.g., encoded in the profile) operative to configure the processor to retrieve, from a profile, at least one required capability for performing a selected task, select, from a component register, one or more entries that include capability lists that include the required capability, and instantiate one or more components corresponding to the selected entries.

In another exemplary implementation, a method of interfacing digital media components on a computer-based processing device comprises constructing a component register with entries having capability lists of digital media components accessible to the computer-based processing device, and, in response to a request from an application for digital media services, searching the capability lists for a component capable of providing the requested service.

In another exemplary implementation, a method of interfacing digital media components on a computer-based processing device comprises constructing a component register containing capability lists of digital media components accessible to the computer-based processing device. At least one listing in the capability lists comprises a first data field that identifies the digital media component, a second data field that identifies a function performed by the digital media component, and a third data field that identifies one or more operational parameters associated function identified in the second data field. In addition, a profile register is constructed.

At least one record (i.e., profile) in the profile register represents a digital media function. The record comprises a data field having one or more operating parameters associated with the digital media function. In response to a request from an application for digital media services, the profile register is searched for a record that corresponds to the requested media service, and the capability register is searched for a component capable of providing the requested service.

In another exemplary implementation, a method of interfacing digital media components on a computer-based processing device is provided. A component register comprising at least one entry including listings of capabilities of digital media components accessible to the computer-based processing device is constructed. At least one listing comprises one or more data fields, including a first data field that identifies a function performed by a digital media component, and a second data field that identifies one or more operational parameters associated with a function identified in the first data field. A profile register comprising at least one record representing a digital media function is constructed. The record comprises a data field having one or more operating parameters associated with the digital media function. In response to a request from an application for digital media services, the profile register is searched for a record that corresponds to the requested media service, and the component register is searched for a component capable of providing the requested service.

In another exemplary implementation, a method of assembling a topology of digital media components on a computer-based processing device is provided. The method comprises reading lists of capabilities from a profile register, searching a component register for entries containing the capabilities indicated in the profile register, and rejecting components that lack the capabilities indicated in the profile register, or that have capabilities incompatible with the capabilities in the profile register.

In another exemplary implementation, a method of assembling and configuring a topology of digital media components on a computer-based processing device is provided. The method comprises using a profile structure and one or more associated capability lists to select a component, instantiating the selected component, applying a profile to the selected component, and logically connecting the component to one or more additional components.

In another exemplary implementation, a method of configuring a topology of encoding and multiplexing digital media components on a computer-based processing device is provided. A profile is searched for a multiplexer subprofile configuration, and a component register is searched for a multiplexer object compatible with the multiplexer subprofile. A multiplexer is instantiated and configured by applying the subprofile configuration settings using an interface API. The multiplexer is connected to an output of a content source. For each input stream of the multiplexer, the profile is searched for an encoder subprofile, the component register is searched for a multiplexer object compatible with the subprofile, and the encoder is configured by applying the subprofile configuration settings using an interface API. The encoder is connected to the multiplexer.

In another exemplary implementation, an API that implements a plurality of methods for controlling one or more devices via a plurality of control identifiers is provided. The control identifiers correspond to one or more configuration settings that have a defined dependency ordering that can be expressed as a directed acyclic dependency graph. The configuration settings are structured such that changing a parameter causes a component to reconfigure one or more dependent settings, and high-level configuration settings can be modified independent of a low-level configuration setting.

DETAILED DESCRIPTION

Exemplary methods, systems, and devices are disclosed for interfacing media components. This document describes an exemplary computer system on which the systems and method described herein may be implemented. Following the description of the computer system is a description of exemplary software architecture. The methods described herein may be embodied as logic instructions on one or more computer-readable media. When executed on a processor, the logic instructions cause a general purpose computing device to be programmed as a special-purpose machine that implements the described methods.

Exemplary Computing System

Figure 1:
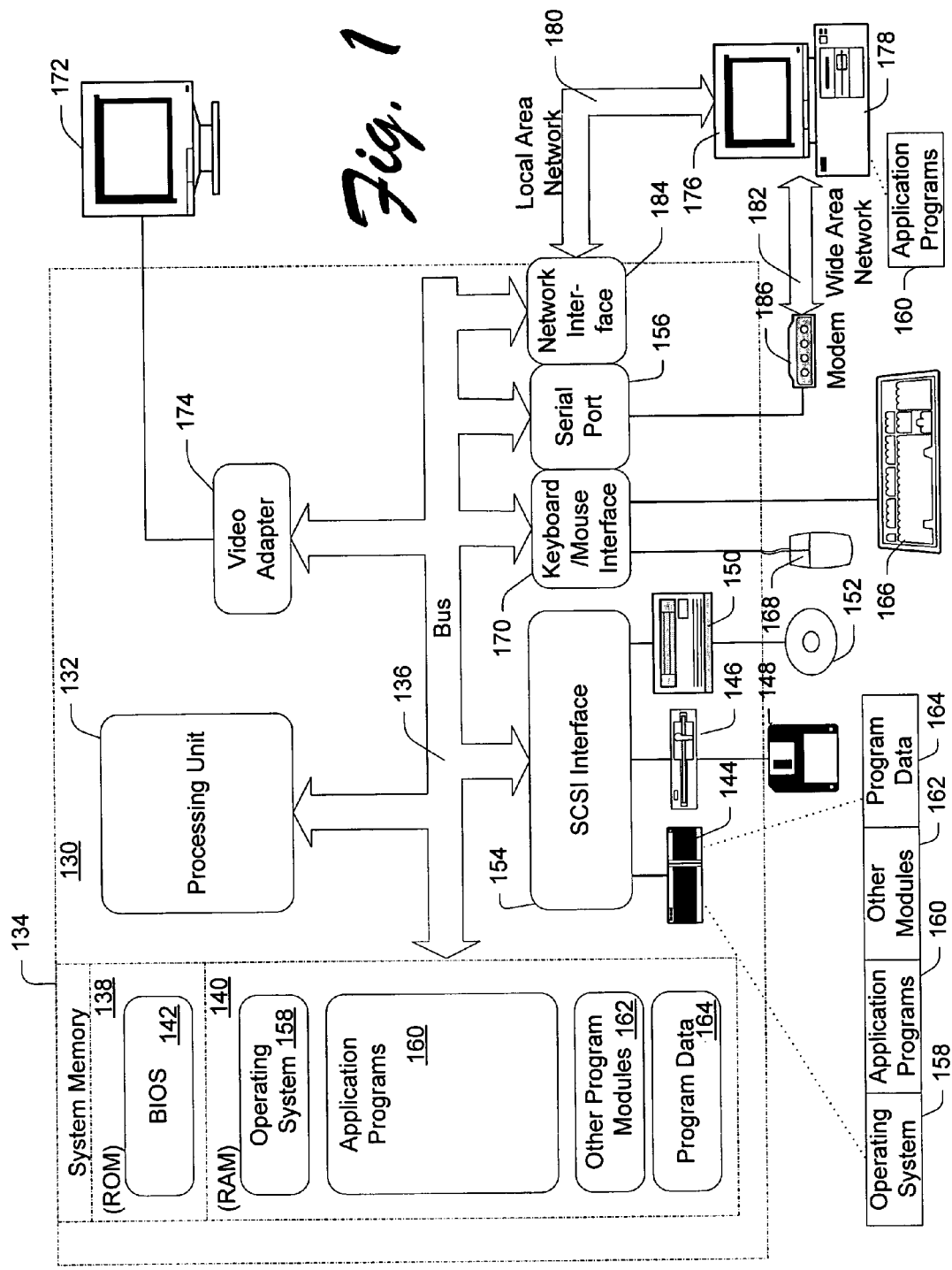
FIG. 1 is a schematic illustration of an exemplary computing device that can be utilized to implement one or more computing devices in accordance with described implementations.

FIG. 1 shows an exemplary computing device 130 that can be utilized to implement one or more computing devices in accordance with the described embodiment. Computing device 130 can be utilized to implement various implementations in accordance with described embodiments.

Computing device 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computing device 130, such as during start-up, is stored in ROM 138.

Computing device 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by a SCSI interface 154 or some other appropriate interface. The drives and their associated computer-readable media provide nonvolatile storage of computer-readable instructions, data structures, program modules and other data for computing device 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computing device 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computing device 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computing device 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computing device 130 is connected to the local network 180 through a network interface or adapter 184. When used in a WAN networking environment, computing device 130 typically includes a modem 186 or other means for establishing communications over the wide area network 182, such as the Internet. The modem 186, which may be internal or external, is connected to the bus 136 via a serial port interface 156. In a networked environment, program modules depicted relative to the computing device 130, or portions thereof, may be stored in the remote memory storage device. It will be appreciated that the network connections shown are exemplary and other means of establishing a communications link between the computers may be used.

Generally, the data processors of computing device 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

Exemplary Software Architecture

For purposes of illustration, a description is provided of an exemplary implementation of an encoder component used in the context of a MICROSOFT DIRECTSHOW digital media streaming architecture. However, the features and operations described herein are not limited to encoder components, nor are they limited to the MICROSOFT DIRECTSHOW digital media streaming architecture. Rather, the features and operations described herein are generally applicable to digital media components operable in a digital media architecture that executes on any operating system including UNIX operating systems and its variants, including Linux operating systems.

Figure 2:
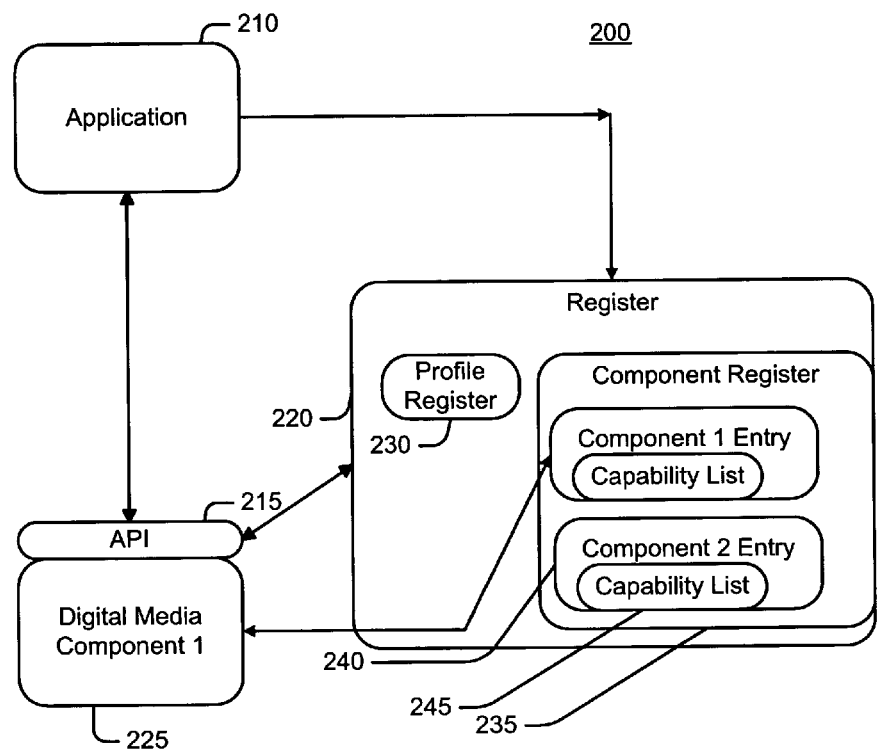
FIG. 2 is a high-level schematic illustration of a software architecture for interfacing with digital media components.

FIG. 2 shows a software architecture for interfacing with digital media components. Referring to FIG. 2 an application 210 interfaces with a digital media component 225 through an API 215. Application 210 may be any application that utilizes the services of a digital media component. Typical applications include a compact disk (CD) player or recorder, a digital video disk (DVD) player or recorder, or any other application that utilizes digital media. Application 215 also interfaces with register 220, which includes a profile register 230 and a component register 235 that contains capability lists 245 within each component's register (e.g. 240).

Profile register 230 stores a plurality of profiles. Each profile in profile register 230 is a fixed list of configuration settings that accomplish a task. For example, a profile may define the settings for low-quality DVD encoding. This profile would include the video and audio encoder settings to produce a low-bandwidth DVD compliant stream. Additional profiles may define the settings for high-quality DVD encoding, MPEG encoding, etc. Capability information in capability lists such as 245 comprises a listing of the capabilities of each digital media components available for use by application 210. Profiles and capabilities are discussed in greater detail below.

Figure 3:
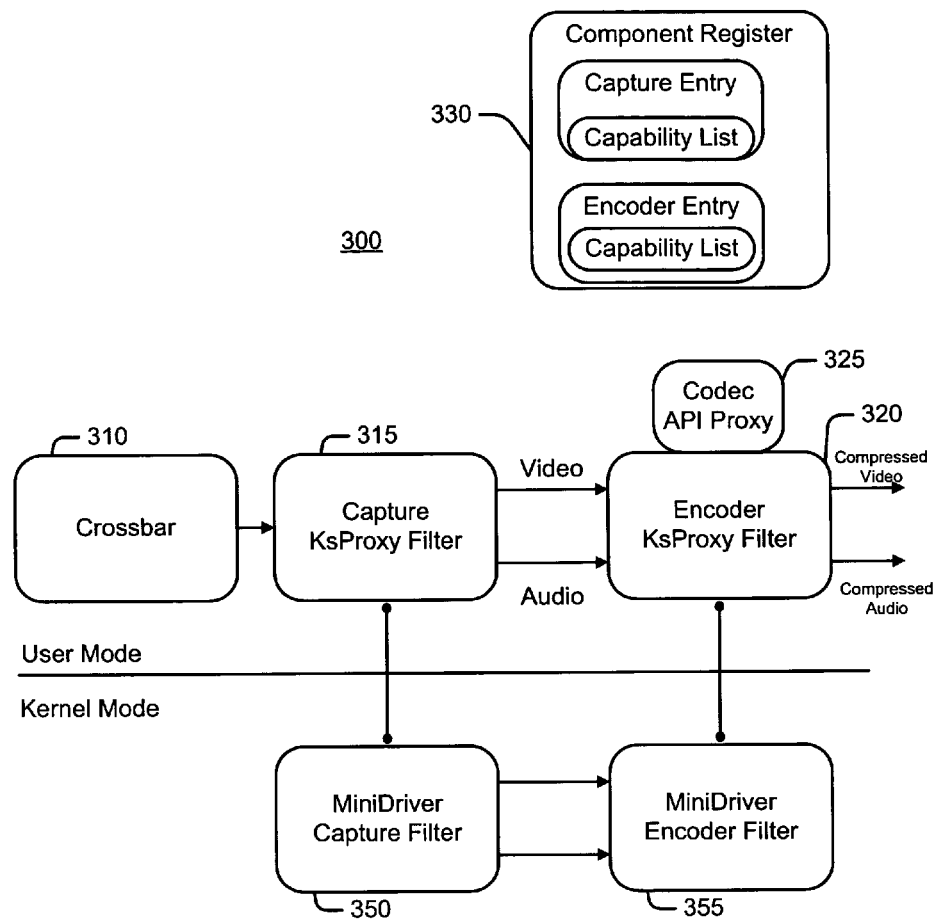
FIG. 3 is a schematic illustration of an exemplary DIRECTSHOW filter graph for a hardware capture/encoder application.

FIG. 3 shows an exemplary DIRECTSHOW filter graph 300 for a hardware implementation of a capture/encoder. Each of the components of filter graph 300 corresponds to a digital media component 225 identified in FIG. 2. The filter graph comprises a crossbar switch filter 310 that is configured to select an output of a digital media device from which a media stream may be received. The output of the crossbar switch 310 is input to a capture proxy filter 315 that controls the hardware that digitizes video and audio signals. The capture proxy filter 315 outputs an uncompressed video signal and an uncompressed audio signal. These signals are input to an encoder proxy filter 320 that encodes the digital audio signals to generate an output comprising compressed video and audio signals.

In an exemplary implementation, the output of encoder proxy filter 320 may be subjected to subsequent downstream processing to generate an MPEG-2 stream. In this embodiment, the output of encoder proxy filter 320 would be input to an MPEG-2 packetizer, which segments the compressed digitized video and audio stream into packets compatible with the MPEG-2 protocol. These packets are then forwarded to an MPEG-2 multiplexer, which multiplexes the packet streams with other packetized audio and/or video streams to generate an MPEG-2 stream. The MPEG-2 stream may be transmitted across a suitable transmission network and decoded by a suitable application at the receiver. It will be appreciated that the output of encoder filter may be processed into any number of digital media formats (e.g., MPEG, WMF, VCD, PVR, etc.). The multiplexer may be another hardware component that outputs a MPEG2 multiplexed stream.

The filters 310, 315, and 320 are instantiated in the user mode of the operating system of the computing device on which the filter graph 300 is implemented. In an exemplary implementation, a series of corresponding AVStream filters, MiniDriver Capture Filter 350 and MiniDriver Encoder Filter 355, are implemented in the kernel mode of the operating system of the operating system of the computing device on which the filter graph 300 is implemented.

Filter graph 300 comprises a codec API proxy 325 that interfaces with the encoder proxy filter 220. The encoder API proxy 325 is a plug-in that translates the encoder API calls into properties destined for an AVStream encoder filter and corresponding topology nodes. Associated with the devices, is a profile 330 that indicates configuration parameters to be used with the encoder proxy filter 320 and the codec API proxy 325. The profile's usage will be discussed in greater detail below. The device's registration adds entries to the component register. In addition, it adds capability lists to the registration information.

Hardware implementations used in a media context other than DIRECTSHOW such as, e.g., Media Foundation, utilize either a source, transform or sink that wraps the encoder subsection of the DirectShow encoder graph or a different proxy component that represents a kernel AVStream filter/chain as a DMO or similar entity.

Figure 4:
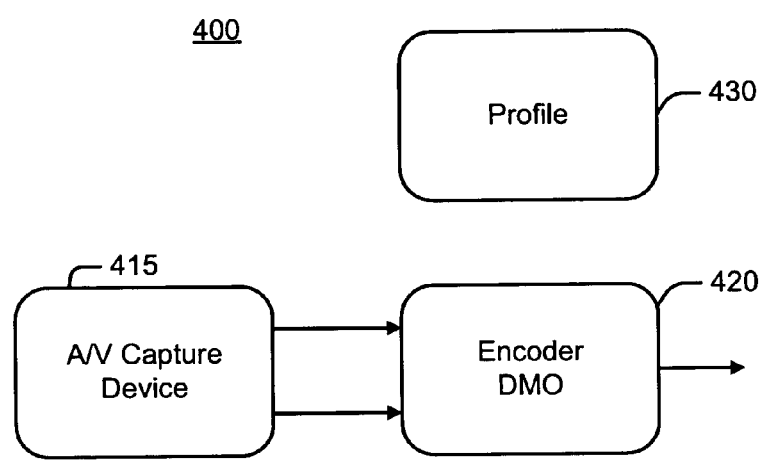
FIG. 4 is a schematic depiction of a portion of a filter graph for a software implementation of a capture/encoder application.

A software implementation of a capture encoder application may have substantially the same architecture as illustrated in FIG. 3, except that the filter graphs may be implemented as DirectX Media Objects (DMOs), Media Foundation Transforms, or other abstraction objects rather than proxy filters. FIG. 4 is a schematic depiction of a portion of a filter graph for a software implementation of a capture/encoder application. Referring to FIG. 4, a software implementation would include an A/V capture device 415, a DMO 420, and a profile 430. A/V capture device 415 corresponds to the capture filter 315 of filter graph 300. The outputs of capture device 415 are directed to encoder DMO 420, which corresponds to the encoder filter 320 of filter graph 300. Profile 430 describes configuration settings to be used with interfaces with the encoder DMO 420.

Another novel approach to defining the semantics of the configuration settings is to enforce a rule that requires configuration settings to have a strong ordering and a hierarchical dependency relationship. This has a significant impact on the design and usage of confirmation settings. Settings may be organized into a dependency tree such that the higher settings in the hierarchy need to be set before specific lower level settings may be set. Changing a high level setting may cause the component to alter one or more dependent settings such that they take on valid and consistent settings. This ensures that devices are in a consistent state when configured by an application or user and removes the need for 'atomic' operations where multiple settings are changed at once to ensure consistency. In addition, this allows applications to alter high level settings (e.g. bit rate, quality etc) without having to know about more esoteric, dependent settings and ensures that devices are in a consistent state if they are modified simultaneously by more than one entity.

Capability Lists in the Component Register

A digital media component such as an encoder can register a list of its high-level capabilities in capability lists within the component register 235 (FIG. 2), which may be implemented as a database or another suitable structured memory device.

In this context, the term "capabilities" can include information such as the actions the digital media component can invoke, the name of the vendor or manufacturer of the component, metadata about the device, types of media it supports, applications for which it is certified and other digital media components with which the component is compatible.

Each capability may be identified using a Globally Unique Identifier (GUID). The capabilities lists may be stored in a branch of the register, e.g., as an array of value names indicated by the capability GUID followed by one or more values. By way of example, an encoder capable of both high-quality and low-quality DVD encoding may register these capabilities in the register.

In an exemplary implementation, capabilities are stored in a data structure using a separate Capabilities identifier (for example, a Window's registry subkey). For example, filter implementers can create a capabilities subkey to store the device's capabilities. The capabilities subkey may be stored with the device's filter's data (e.g. FilterData item), and the filter's textual name (e.g. FriendlyName) values in the filter's static data. Alternatively, encoder vendors can create a reference in the filter's data to indicate the location of the capabilities (e.g. a CapabilitiesLocation key that contains a string giving the location of the Capabilities subkey in the register.) to allow sharing capabilities across components. In current versions of Windows, Plug and Play (PnP) lacks a convenient mechanism for a driver to specify the location of the Capabilities subkey relative to its PnP entry. This problem is solved by specifying that the driver's setup files can simply create a capabilities subkey adjacent to the filter's FriendlyName.

In one implementation, each subkey value may be implemented as one of the following: (1) a single numerical value, stored as a DWORD value; (2) a GUID, stored as in the string form of the GUID; (3) ratio quantities or numerical pairs that represent pairs of values such as width/heights and/or fractional values represented as a numerator/denominator, e.g., a data pair of the format 'a, b' used to denote that the value should be interpreted as two DWORDs concatenated together to form a 64 bit integer, with the value of 'a' being in the upper DWORD; (4) arrays of values.

In another implementation, each subkey value may be implemented as a single numerical value indicating the data type of the value, stored as an integer value followed by a textual encoding of the value. The actual encoding would be obvious to someone skilled in the art; e.g. an integer would be coded as textual number, a GUID could be stored as in the string form of the GUID; ratio quantities or numerical pairs that represent pairs of values such as width/heights and/or fractional values represented as a numerator/denominator (as previously described). For unknown types, a binary encoding of the data could be used.

In another implementation, the capability's location key could indicate the location of an XML file to store a description of the device's capability.

Figure 5:
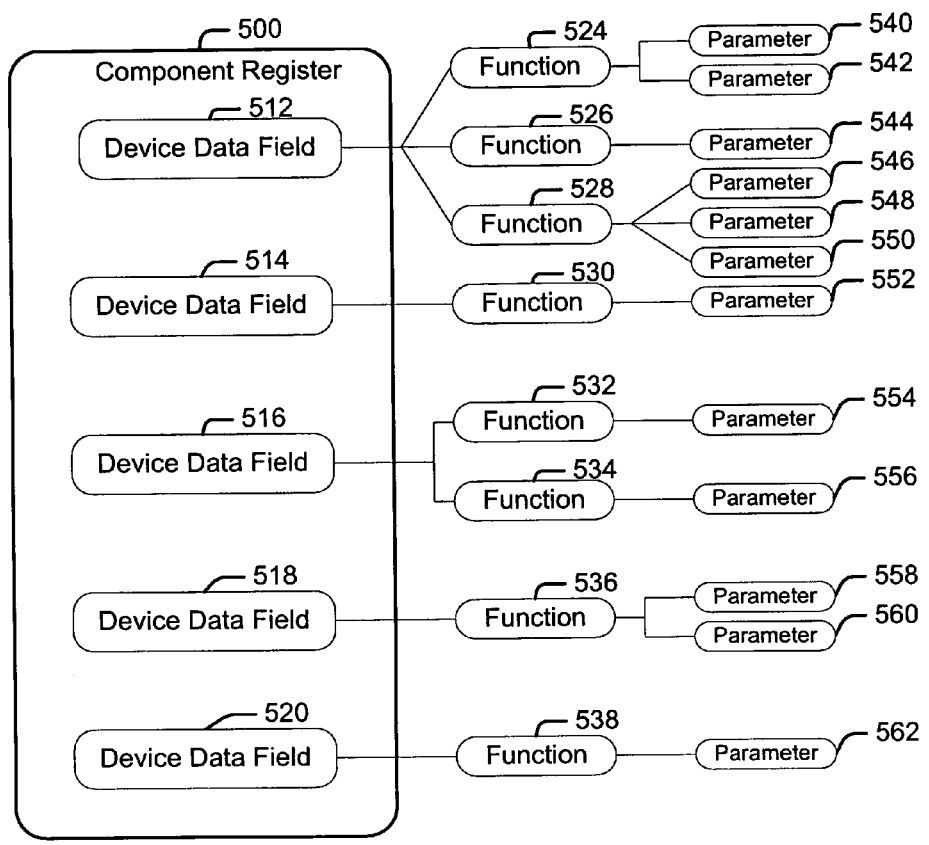
FIG. 5 is a schematic depiction of an entry in a capability list.

FIG. 5 is a schematic depiction of an exemplary implementation of a component register 500 which encodes capability lists. Referring to FIG. 5, component register 500 is embodied as a data structure that may be stored in a suitable memory location such as, e.g., the RAM 140 of computing device 130. The component register 500 may be implemented as a database, or more simply as a logically linked list. The component register 500 comprises a plurality of data fields 512-520 that may include an entry that contains enough information to identify a digital media component and possibly enough information to instantiate the object. The component register is illustrated with five data fields; however this number is not critical. Any number of data fields may be implemented.

Each data field 512-520 that corresponds to a device is logically linked to a collection of at least one subfield 524-538 (i.e. a capabilities list) that includes information identifying a function performed by the device identified in the data field. Each subfield 524-538 is, in turn, logically linked to at least one additional subfield 540-562 that includes information identifying one or more operational parameters associated with the capability identified in the subfield.

Following is an exemplary entry for a filter device identified by the FriendlyName "MyFilter". The capabilities list entry for the filter comprises four capabilities, identified by GUID1, GUID2, GUID3, and GUID4. The values associated with the GUIDs would be determined by the characteristics of the filter. By way of example, MyFilter may be a DVD encoder, and one of the GUIDs may specify encoding capabilities of the filter.

```
FriendlyName REG_SZ "My filter"
 +Capabilities (subkey)
    GUID1   REG_DWORD       Value1
    GUID2   REG_SZ          "Value2"
    GUID3   REG_SZ_MULTI    "Value3a", "Value3b", "Value3c" . . .
    GUID4   REG_SZ_MULTI    "720,480", "320,240",
```

In the context of a DIRECTSHOW application, software filters can register directly with the component register. In operation, an application such as application 210 retrieves a register handle to read a capabilities subkey using the interface on a filter's moniker (a moniker is a reference to a component register entry corresponding to the descriptive information about the device, e.g. items 512-520 in FIG. 5).

Figure 6:
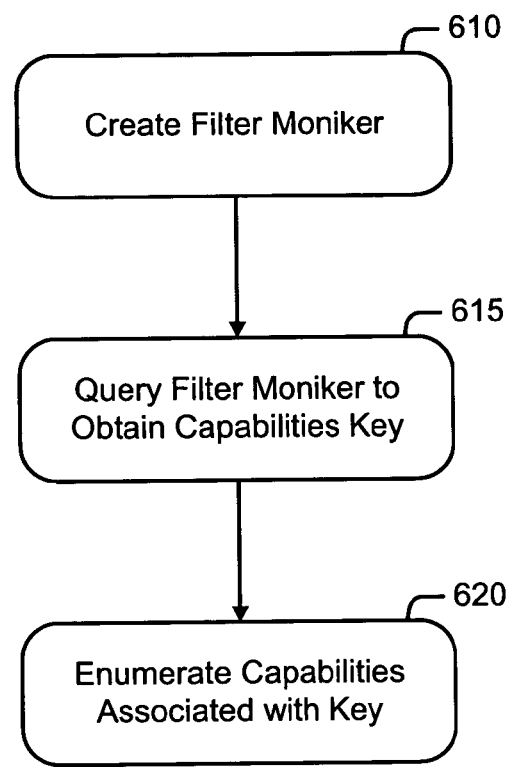
FIG. 6 is a flowchart illustrating operations to enumerate the capabilities of a digital media component.

FIG. 6 illustrates operations 600 an application may implement to enumerate the capabilities of a particular encoder. At operation 610 the application creates a moniker that represents the encoder filter (i.e. obtains a reference to the component register's entry corresponding to the encoder filter). At operation 615, the application queries the filter moniker to obtain the capabilities of a software or hardware encoder from the register. In an exemplary embodiment this query may be performed using the DIRECTSHOW IGetCapabilitiesKey interface. The IGetCapabilitiesKey interface exposes the GetCapabilitiesKey method, which returns a handle to the register key that contains the filter's capabilities list. The application can invoke the GetCapabilitiesKey method to obtain the register key. With the register key, the application can invoke the RegEnumValue function to enumerate the values for the returned key (operation 620). Hardware filters, or their proxy filters, can register using .inf register key sections. In this way, the register maintains a listing of the capabilities of digital media components available for use by an application.

Exemplary Profile Register

Register 230 also maintains a profile register 235, which is a fixed list of profiles, each containing lists of configuration settings used to accomplish a particular task. The profile register 230 may be implemented using a data structure substantially similar to the data structure used to implement the capabilities register 235. The data structure may be embodied as a database, a linked list, or any other suitable data structure.

By way of example, there may be a profile that defines low bandwidth DVD encoding, which lists all the video and audio encoder settings required to produce a low-bandwidth DVD compliant stream, as follows:

```
FriendlyName = "LowBandwidthDVD"
   {realtime}="true"
   + {video encoder GUID}
      "{bitrate_guid}"=2000000
      "{resolution_guid}"="720,480"
      "Required GUIDS"="{guid1},{guid2}"
   + {audio encoder GUID}
      "{bitrate_guid}"=50000
   + {multiplexer GUID}
      "{max_bitrate_guid}"=2500000
```

Figure 7:
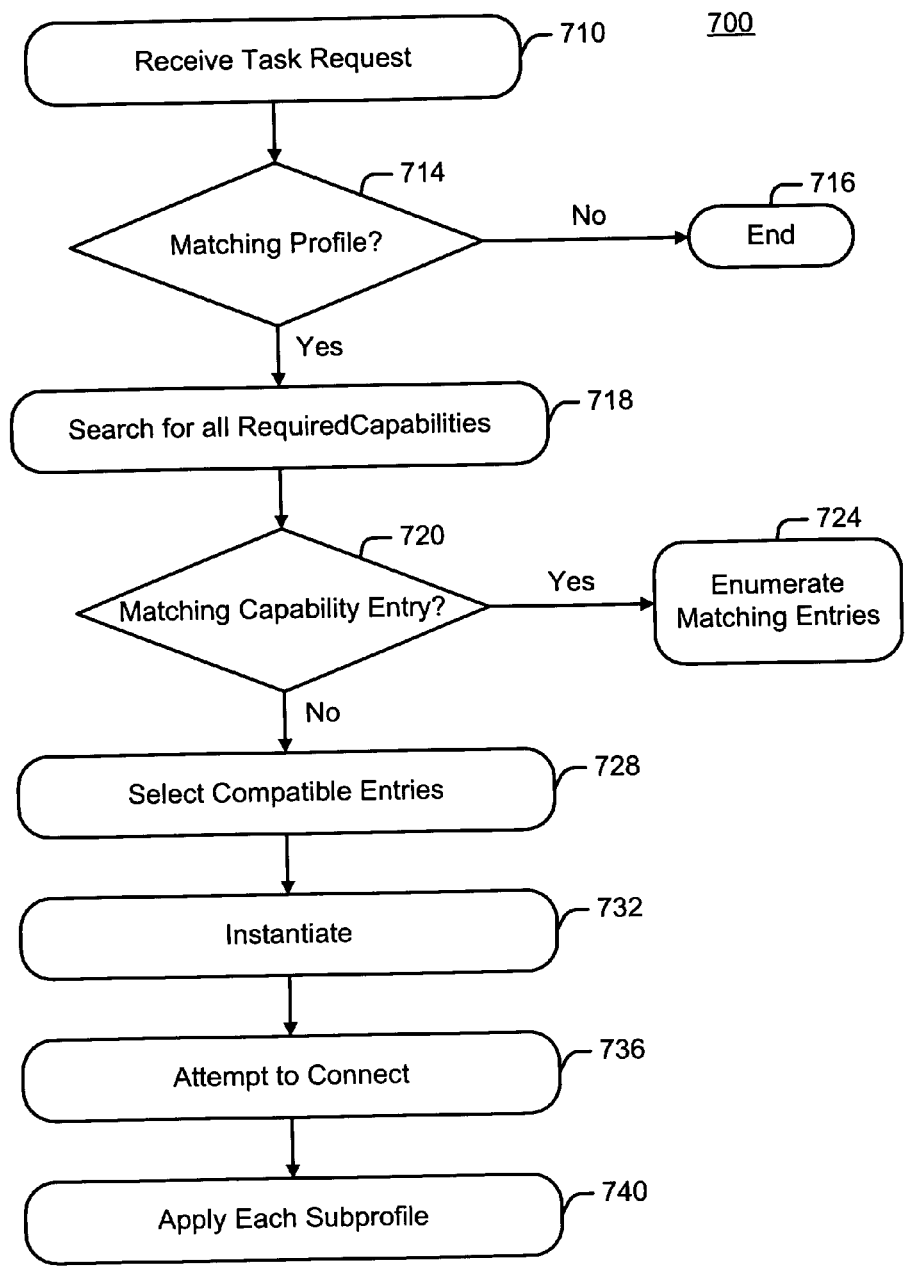
FIG. 7 is a flowchart of operations an application may execute to interface a plurality of digital media components to construct a device that performs a task.

Profiles can be identified by a GUID, which is recorded in the string form of a GUID to aid in uniquely identifying them (this is not required in all implementations but solves indexing issues for the application). Profiles may also include a value that identifies the profile to aid in providing a textual description of the profile to a user interface. In FIG. 7, the identifier "FriendlyName" identifies the profile as LowBandwidthDVD. Profiles are independent of any particular digital media component.

Each profile may include one or more subprofiles, each of which is identified by a GUID, and one or more parameters, or settings. Subprofiles may be assigned to functional categories, e.g., video encoding, audio encoding, multiplexing, etc. Settings define attributes of the functionality represented by the subprofile. Settings may be application-specific or device-specific. For example, if a single bit rate is specified in the profile, then the specified bit rate will be applied to all components supporting the profile. By contrast, if separate video and audio bit rates are specified in the profile, e.g., by two separate GUIDs, then separate bit rates may be applied to video and audio processing.

Each subprofile may also include a "RequiredCapabilities" field that indicates which GUIDs are required to be present in the capabilities list for devices. Capabilities are represented by GUIDS, so the RequiredCapabilities field, Required GUIDS may be used to generate a rejection filter for devices which lack required settings for a particular profile.

Profiles can also include a 'CriticalSettings' field that an application can use to determine which configuration settings must succeed to deem if the profile was successfully applied. In some circumstances, failing to set a configuration setting may not inhibit the encoder from accomplishing the desired task.

Exemplary Application Programming Interface

In an exemplary embodiment an application programming interface (API) is provided to enable an application to communicate with digital media components listed in the component register, or otherwise registered on the system. The API implements methods that enable an application to monitor and/or modify the settings of a digital media component. A summary of the methods implemented by an exemplary API for an encoder is encapsulated in the following table (collectively known as the ICodecAPI interface).

| Method/Parameters | Description |
| --- | --- |
| GetAllSettings( )<br>pStream[in]: a pointer to the stream | Saves the current encoder settings to a stream. This method enables an application to package a digital media component's current configuration in a stream, which can be saved and subsequently reinstated. |

-continued

| Method/Parameters | Description |
|---|---|
| GetDefaultValue( )<br>Api[in]: a pointer to a GUID that specifies the parameter<br>Value [out]: a pointer to a VARIANT type that receives the default value. | Retrieves the default value for a parameter, if one exists. |
| GetParameterRange( )<br>Api [in]: a pointer to a GUID that specifies the parameter;<br>ValueMin [out]: a pointer to a VARIANT type that receives the minimum value of the parameter;<br>ValueMax [out]: a pointer to a VARIANT type that recieves the maximum value of the parameter;<br>SteppingDelta [out]: a pointer to a VARIANT type that receives the stepping delta, which defines the valid increments from ValueMin to ValueMax. | Returns the valid range of values for a parameter. Also returns an increment value for a parameter, if one exists. |
| GetParameterValues( )<br>Api [in]: a pointer to a GUID that specifies the parameter.<br>Values [out]: An address of a variable that receives a pointer to an array of VARIANT types. The array contains the list of values the encoder supports for this parameter. The caller may free the array by calling the CoTaskMemFree function.<br>ValuesCount [out]: a pointer to a variable that receives the number of elements in the array. | Returns the list of supported values for a given parameter. The list is returned as a COM allocated array. The array may be |
| GetValue( )<br>Api [in]: a pointer to a GUID that specifies the parameter.<br>Value [out]: a pointer to a VARIANT type that receives the value of the parameter. | Retrieves the current value of a specified parameter. |
| IsModifiable( )<br>Api [in]: a pointer to a GUID that specifies the parameter. | Queries whether a parameter can be changed. Returns a value that indicates whether parameter can be changed. |
| IsSupported( )<br>Api [in]: a pointer to a GUID that specifies the parameter. | Queries whether a given parameter is supported. Returns a value that indicates whether a parameter is supported. |
| RegisterForEvent( )<br>Api [in]: a pointer to a GUID that specifies the event.<br>userData [out]: a pointer to caller-defined data. The application receives this pointer in the event parameter. The application can use this data to differentiate events coming back from several encoders. | Registers the application to receive a specified event from the encoder. The application will receive an event notification whenever the encoder driver sends the event. |
| SetAllDefaults( ) | Returns all parameters to their default values. |
| SetAllDefaultsWithNotify( )<br>ChangedParam [out]: An address of a variable that receives a pointer to an array of GUIDs, of size ChangedParamCount. The array contains the GUIDs of the parameters that have changed in the encoder as a result of this method call. The caller may free the array by calling the CoTaskMemFree function. | Returns all parameters to their default values, and returns a list of the settings that have changed. |

-continued

| Method/Parameters | Description |
|---|---|
| ChangedParamCount [in]: A pointer to a variable that receives the number of elements in the array. | |
| SetAllSettings( )<br>pStream[in]: a pointer to the stream | Loads encoder settings from a stream and sets them on the encoder. |
| SetAllSettingsWithNotify( )<br>Api [in]: a pointer to a GUID that specifies the parameter.<br>Value[in]: a pointer to a VARIANT type that contains the new value for the parameter.<br>ChangedParam [out]: an address of a variable that receives a pointer to an array of GUIDs, of size ChangedParamCount. The array contains the GUIDs of the parameters that have changed in the encoder as a result of this method call. The caller may free the array by calling the CoTaskMemFree function.<br>ChangedParamCount [out]: a pointer to a variable that receives the number of elements in the array. | Loads encoder settings from a stream, sets them on the encoder, and returns a list of the settings that have changed. |
| SetValue( )<br>Api [in]: a pointer to a GUID that specifies the parameter.<br>Value [out]: a pointer to a VARIANT type that contains the new value for the parameter. | Sets the value of a parameter. |
| SetValueWithNotify( )<br>Api [in]: a pointer to a GUID that specifies the parameter.<br>Value[in]: a pointer to a VARIANT type that contains the new value for the parameter.<br>ChangedParam [out]: an address of a variable that receives a pointer to an array of GUIDs, of size ChangedParamCount. The array contains the GUIDs of the parameters that have changed in the encoder as a result of this method call. The caller may free the array by calling the CoTaskMemFree function.<br>ChangedParamCount [out]: a pointer to a variable that receives the number of elements in the array. | Sets the value of a parameter, and returns a list of other settings that have changed as a result. |
| UnregisterForEvent( )<br>Api [in]: a pointer to a GUID that specifies the event. | Unregisters the application for a specified encoder event. |

In an exemplary embodiment, an intermediate layer which we will refer to as the 'encapi' layer, implements the ICode-cAPI interface by mapping Get/Set calls into KsPropertySet calls that are sent to the underlying driver. The 'encapi' layer implements the more complex functions such as 'WithNotify' or change event notifications by using a special series of driver property sets that may be used to interface with devices:

CODECAPI_VIDEO_ENCODER: Video encoders use the support of this GUID (queried by the user-mode KsProperty BASICSUPPORT) to indicate they are a video encoder. The property value (operation data) is of type BOOL and specifies whether the minidriver supports video encoding. A value of TRUE indicates that the minidriver supports video encoding. The filter should not support this GUID if it is not a video encoder.

CODECAPI_AUDIO_ENCODER: Audio encoders use the support of this GUID (queried by the user-mode KsProperty BASICSUPPORT) to indicate they are an audio encoder. The property value (operation data) is of type BOOL and specifies whether the minidriver supports audio encoding. A value of TRUE indicates that the minidriver supports audio encoding. The filter should not support this GUID if it is not an audio encoder.

CODECAPI_SETALLDEFAULTS: This property is used to implement the 'SetAllDefaults' method and will reset all the internal settings of the minidriver to their default configurations. A set to this property set is a trigger that the device should reset all of its settings to their defaults.

CODECAPI_ALLSETTINGS: This property is used to pass back and forth a minidriver-generated block of data. The property value is of type PVOID, which is a pointer to a user-mode buffer for the minidriver-generated block of data. It is used to instruct the driver to encode all of its configuration state into a block of binary data and is used to implement the method 'GetAllSettings'.

On a property get call, if an application makes a property get call with a zero length buffer, then the minidriver returns STATUS_BUFFER_OVERFLOW and specifies the required buffer size. If the length buffer is non-zero, then the minidriver returns STATUS_BUFFER_TOO_SMALL if the supplied buffer is too small for the data block. Otherwise the minidriver packs its settings into a data block that can be restored later.

On a property set call the minidriver verifies the data's integrity and checks that the data block size is under the maximum data size. It also verifies the CRC and the header length. The minidriver must also cache any changes to be propagated for CODECAPI_CURRENTCHANGELIST. The property set call with the 'CODECAPI_ALLSETTINGS' parameter is used to implement the method 'SetAllSettings'.

It is the minidriver's responsibility to add data integrity checks to the data, such as a unique GUID to indicate the minidriver generated the data, a cyclic redundancy check (CRC), and a header length. The data returned should be lightweight and contain only information required to reconstruct the current settings. Applications may use this property for multi-level undos, stored with their projects, etc.

CODECAPI_SUPPORTSEVENTS: This property is used to indicate whether the minidriver supports user-mode events. The property value is of type BOOL, which specifies whether the minidriver supports user-mode events. A value of TRUE indicates the minidriver provides support. The minidriver should not support this GUID if it does not support the event mechanism. This property is used to implement if 'RegisterForEvent' should be enabled.

CODECAPI_CURRENTCHANGELIST: This property is used to indicate which parameters changed in a previous property "set" call, such as CODECAPI_ALLSETTINGS and CODECAPI_SETALLDEFAULTS. The property value (operation data) is an array of GUIDs. This property is used to implement the 'WithNotify' methods by calling the 'Set' call first, then reading this property to pass back the changed setting list to the application.

On a property get call, if an application makes a property get call with a non-zero buffer size, the minidriver returns STATUS_BUFFER_TOO_SMALL if the supplied buffer is too small for the data block. If there are no items to return, the minidrivers returns STATUS_SUCCESS. Otherwise, a list of GUIDs is returned. On a property set call, the current list of changed GUIDs is reset.

Exemplary Operations

Figure 8:
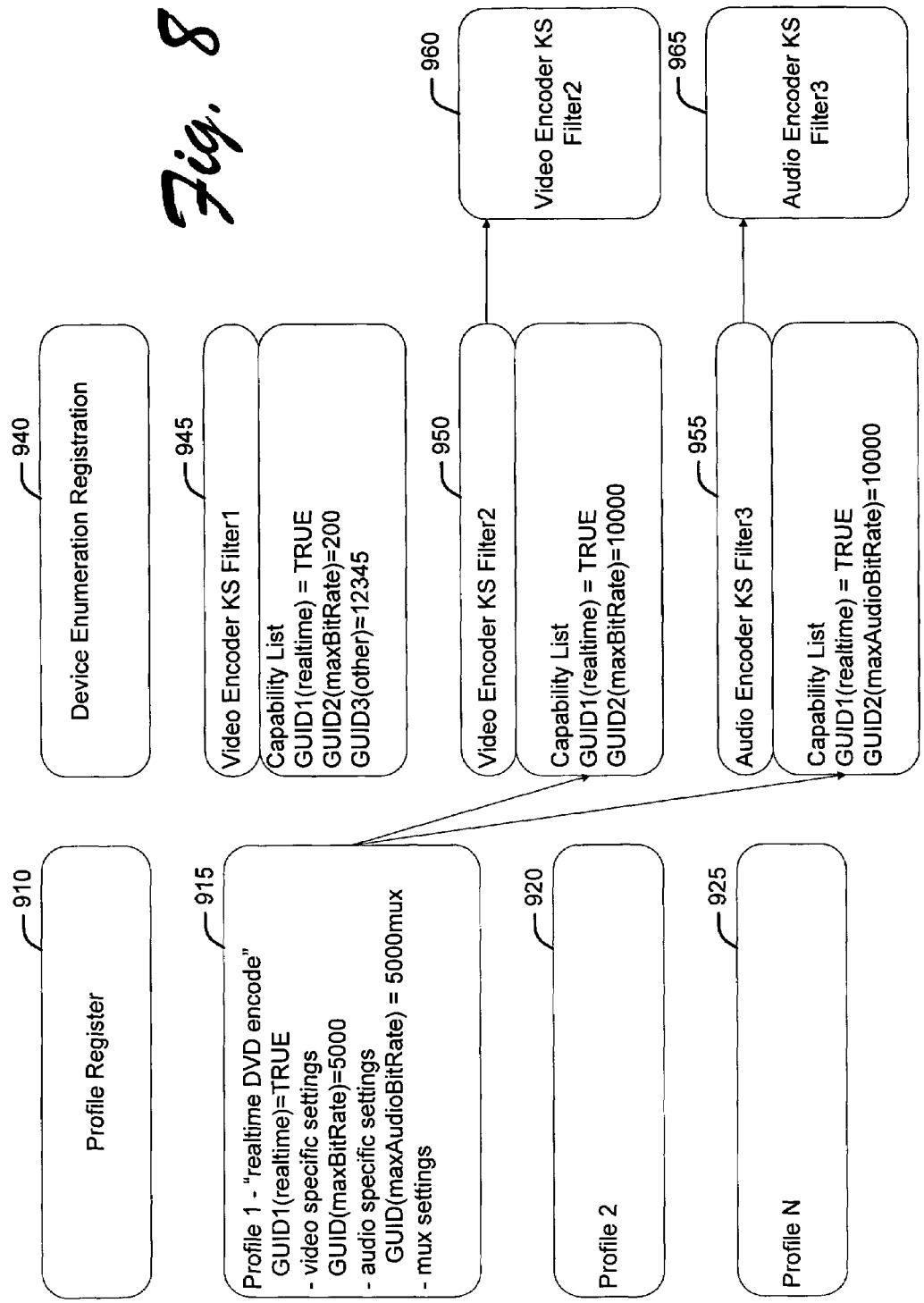
FIG. 8 is a schematic depiction of an exemplary mapping of profiles onto capabilities.

In an exemplary implementation, an application may utilize one or more profiles in the profile register 230 and capabilities in component register 235 to construct digital media devices having a particular functionality from the various registered digital media components. This is illustrated with reference to FIG. 7 and FIG. 8. FIG. 7 is a flowchart of operations 700 an application may execute to interface a plurality of digital media components to construct a device that performs a task. FIG. 8 is a schematic depiction of an exemplary mapping of profiles onto capabilities.

Referring to FIGS. 7-8, at operation 710 a request is received to perform one or more tasks associated with a particular function. By way of example, an application may need to perform real time DVD encoding. The request may be generated automatically by the application, or may be generated by a user of the application.

At operation 714 it is determined whether there is a profile matching the requested task in the profile register. By way of example, the profile register may be searched for a profile matching the requested task. If there is not a matching profile in the profile register, then the process terminates at operation 716. By contrast, if there is a matching profile in the profile register, then the matching profile is selected from the profile register.

At operation 718 the component register is searched for a component with a capabilities list having all the required capabilities identified in the "RequiredCapabilities" field of the selected profile. In an exemplary implementation, the capabilities register may be searched for entries having GUIDs which match the GUIDs enumerated in the RequiredCapabilities field of the selected profile. If one or more entries in the capability register match (operation 720), then the matching component(s) are enumerated at operation 724.

At operation 728 the process selects entries having settings that are compatible with the settings in the selected profile. If one or more matching entries were located at operation 720 and enumerated at operation 724, then operation 728 is performed on the set of matching entries. By contrast, if no matching entries were located at operation 720, then operation 728 is performed on all entries in the capability register which have a function that corresponds to the requested function. By way of example, if the requested function is DVD encoding, then operation 728 searches all DVD encoder entries in the capability register. Entries in the capability register may be considered compatible with the selected profile if the settings in the capability register are within the range of settings specified in the selected profile.

At operation 732 the selected device(s) are instantiated. By way of example, in the DIRECTSHOW environment the devices may be instantiated by invoking existing interface methods, such as, e.g., the ICreateDevEnum interface.

At operation 736 the selected device(s) are connected to other selected device(s) required to perform the requested task. By way of example, in the DIRECTSHOW environment the devices may be connected by invoking existing interface methods such as, e.g., the IFilterGraph interface, the IGraphBuilder interface, and the IFilterGraph2 interface. If the search process yields multiple components compatible with the profile, then any of multiple components may be connected.

At operation 740 the settings in the subprofile of the selected profile are applied to the instantiated component. By way of example, in the DIRECTSHOW environment the subprofile may be applied by invoking the interface methods described above such as, e.g., the SetAllSettings interface or the SetValue interface. The 'CriticalSettings' field in the subprofile can be used to determine which settings must succeed to constitute a successful application of the subprofile settings.

FIG. 8 is a schematic illustration of a mapping between the profile register and the capabilities in the component register in response to a request for a real time DVD encoder. Referring to FIG. 8, the profile register 810 includes a plurality of entries 815-825 including an entry for a real time DVD encoder 815. The capabilities in the component register 840 includes a plurality of entries, including entries for video and audio encoders 845-855.

In response to a request for a real time DVD encoder, the profile entry 815 is selected. Profile entry 815 lacks a RequiredCapabilities field, so a search of the entire capability register is performed to locate entries that have settings within the ranges specified in the profile entry 815. Referring to entry 845, the entry for video encoder KS Filter1 is rejected because its maxBitRate setting of 200 is less than maxBitRate of 5000 specified in profile 815. By contrast, referring to entry 850, the entry for video encoder KS Filter2 is selected because its maxBitRate of 10,000 exceeds the maxBitRate of 5000 specified in profile 815. Similarly, referring to entry 855, the entry for audio encoder KS Filter3 is selected because its maxBitRate of 10,000 exceeds the maxBitRate of 5000 specified in profile 815. Accordingly, video encoder KS Filter2 and audio encoder KS Filter3 are instantiated as digital media components 860 and 865, respectively. Encoders 860, 865 may be connected to other digital media components, e.g., multiplexers, packetizers, etc., to create a digital media device that performs a specific function.

Multi-Pass Generalization of Exemplary Operations

The previously described selection algorithm can be generalized to a multi-pass selection algorithm. Each capability listed in the "Required Capability' field in a profile is can be treated as a rejection criteria for performing comparisons against capabilities listed in the capability lists in the component register. If a capability is listed in both the required list and in the capability list and they are not compatible, then the component can be rejected for consideration to be instantiated to attempt to apply the subprofile settings.

If a capability is present in the 'required' list but is not present in the device's capability list, then no conclusion can be drawn so the device must be considered on a subsequent pass. Similarly if no required capabilities list is present, then all devices must be considered to be instantiated.

The algorithm assembling the components may attempt to assemble those components with exact capabilities matches first, followed by another pass including components that did not have the required capabilities mentioned in their capability lists. Applications can also include their own capability filtering criteria by including additional 'RequiredCapabilities'. For example, an application may only include components provided by a particular vendor. If locating such components fails, then the requirement lists could be changed by the application and retried using the algorithm.

Exemplary Profiles and Operations for Multiplexer/Encoding Applications

Figure 9:
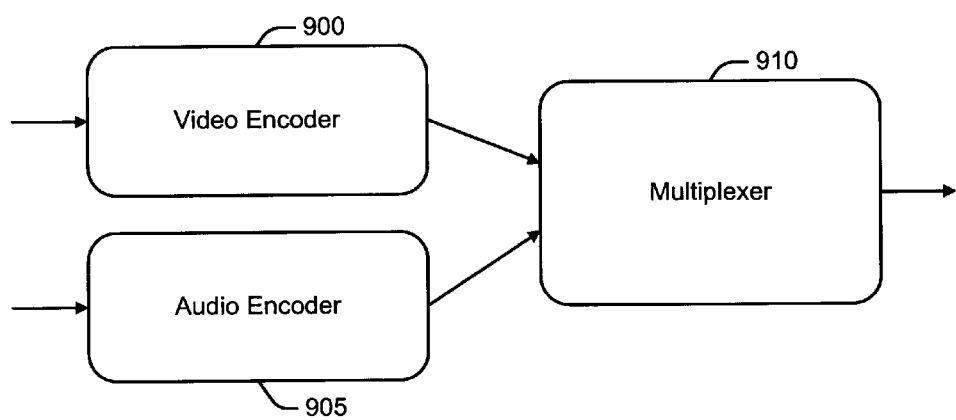
FIG. 9 is a schematic depiction of applying a profile to an encoding topology.

Encoding applications usually imply a specific arrangement structure, illustrated in FIG. 9. Typically there is a multiplexer device 910 which receives compressed streams and multiplexes them together (i.e., the multiplexer alternates the input streams while ensuring time stamping and format specific buffering restrictions are met). There are one or more inputs to the multiplexer. Typically these are supplied by one or more video encoders 900 and audio 905 encoders.

In an exemplary implementation a profile, associated settings and usage semantics may be designed such that an encoder topology can be built and configured from a generic encoding profile. The topology in FIG. 9 may be constructed from the multiplexer to the encoders. The profile may be designed such that there is an identifiable subprofile for the multiplexer from the profile's N+1 subprofiles.

In an exemplary implementation, the topology may be built and configured using the following operations. The output filter/device is created, as described above. A partial encoding topology is constructed, e.g., by selecting the multiplexer using the selection procedures described above. The multiplexer is configured using the subprofile associated with the operation, including the number of input streams, and connected to the output of the encoders. For each multiplexer input, which corresponds to each of the N subprofiles (excluding the multiplexer subprofile), an encoder is selected, e.g., using the selection algorithm described above, configured using the subprofile settings, and connected to the multiplexer's input. The media's video and audio sources may then be created and the sources may be connected to the topology, e.g., using connection algorithms provided in DIRECTSHOW.

Although the described arrangements and procedures to reconcile file systems interconnected components have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of selecting at least one digital media component to construct a device that accomplishes one or more tasks identified in an extensible profile, comprising:

retrieving, from the extensible profile, at least one required capability for performing the selected task as requested by an application, wherein the extensible profile is a fixed list of configuration settings that accomplish the selected task;

selecting, from a component register, one or more component entries with capability lists that include the required capability, wherein the capability lists comprise a listing of capabilities of the each digital media component available for use by the application; and instantiating one or more components corresponding to the selected entries, wherein instantiating occurs via an Application Programming Interface (API), wherein the application uses the extensible profile to determine which of the one or more components are needed for the selected task, wherein the extensible profile may be updated or modified without modifying the application, wherein control identifiers used by the API for controlling one or more devices correspond to the fixed list of configuration settings which have a defined dependency ordering that can be expressed as a directed acyclic dependency graph, wherein the fixed list of configuration settings are structured such that changing a parameter causes a component to reconfigure one or more dependent settings, and high-level configuration settings can be modified independent of a low-level configuration setting, and wherein at least one capability is stored as a registry subkey, that is implemented as a ratio quantity or a numerical pair that represent pairs of values.

2. The method of claim 1, wherein retrieving from the extensible profile at least one required capability for performing the selected task comprises:
   receiving a request to perform a selected task; and
   searching the extensible profile for one or more entries corresponding to the selected task.

3. The method of claim 1, wherein a profile register comprises at least one extensible profile, and wherein each extensible profile comprises a key that identifies a task.

4. The method of claim 3, wherein an extensible profile comprises at least one subprofile entry, wherein the subprofile entry identifies a capability required to perform the task associated with the profile entry.

5. The method of claim 4, wherein the subprofile entry comprises:
   a subprofile identifier that uniquely identifies the subprofile entry; and
   one or more operating parameters associated with the function.

6. The method of claim 4, wherein selecting one or more entries from a component register that includes a capability list with the required capability comprises searching a component register for entries with capability lists comprising an identifier equal to one or more subprofile identifiers associated with the selected task.

7. The method of claim 6, wherein selecting, from a component register, one or more entries whose capability lists include the required capability comprises searching a component register entry's capability list for entries comprising:
   an identifier equal to one or more subprofile identifiers associated with the selected task; and
   operating parameters compatible with the operating parameters specified in the subprofile.

8. A computer readable storage media having computer-readable instructions thereon which, when executed by a computer, implement the method of claim 1.

9. A computer readable storage media having computer-readable instructions thereon which, when executed by a computer, implement the method of claim 6.

10. An apparatus, comprising:
   a processor;
   a memory module connected to the processor and comprising logic instructions operative to configure the processor to:
      retrieve, from an extensible profile, at least one required capability for performing a selected task as requested by an application, wherein the extensible profile is a fixed list of configuration settings that accomplish the selected task;
      select, from a component register, one or more entries that include the required capability in their capability list; and
      instantiate via an application programming interface (API) one or more components corresponding to the selected entries;
   wherein the application uses the extensible profile to determine which of the one or more components are needed for the selected task,
   wherein the extensible profile may be updated or modified without modifying the application;
   wherein control identifiers used by the API for controlling one or more devices correspond to the fixed list of configuration settings which have a defined dependency ordering that can be expressed as a directed acyclic dependency graph, and
   wherein the fixed list of configuration settings are structured such that changing a parameter causes a component to reconfigure one or more dependent settings, and high-level configuration settings can be modified independent of a low-level configuration setting.

11. The apparatus of claim 10, further comprising:
   an interface for receiving a request to perform the selected task; and
   logic instructions, executable on the process in response to receiving the request, for searching a profile register for one or more entries corresponding to the selected task.

12. The apparatus of claim 10, wherein a profile register comprises at least one extensible profile, and wherein each extensible profile comprises a key that identifies a task.

13. The apparatus of claim 12, wherein the extensible profile comprises at least one subprofile entry, wherein the subprofile entry identifies a capability required to perform the task associated with the profile entry.

14. The apparatus of claim 13, wherein the subprofile entry comprises:
   a subprofile identifier that uniquely identifies the subprofile entry; and
   one or more operating parameters associated with the function.

15. The apparatus of claim 13, wherein the logic instructions operative to configure the processor to select, from a component register, one or more entries whose capability lists include the required capability further comprise logic instructions operative to configure the process to search a component register for entries with capability lists comprising an identifier equal to one or more subprofile identifiers associated with the selected task.

16. The apparatus of claim 15, wherein the logic instructions operative to configure the processor to select, from a component register, one or more entries whose capability lists include the required capability further comprise logic instructions that configure the processor to search a component register for entries whose capability lists comprise:
   an identifier equal to one or more subprofile identifiers associated with the selected task; and
   operating parameters compatible with the operating parameters specified in the subprofile.

17. A method of interfacing digital media components on a computer-based processing device, comprising:
   constructing a component register comprising of entries which contain listings of capabilities of digital media components accessible to the computer-based processing device; and
   in response to a request from an application for digital media services, searching the component register for a component capable of providing the requested service,
   wherein the application uses an extensible profile to determine which of the digital media components are needed for the selected task; wherein the extensible profile is a fixed list of configuration settings that accomplish the selected task;
   wherein the extensible profile may be updated or modified without modifying the application; and
   wherein at least one capability is stored as a registry subkey that is implemented as a ratio quantity or a numerical pair that represent pairs of values; wherein control identifiers for controlling one or more devices correspond to the fixed list of configuration settings which have a defined dependency ordering that can be expressed as a directed acyclic dependency graph; wherein the fixed list of configuration settings are structured such that changing a parameter causes a component to reconfigure one or more dependent settings, and high-level configuration settings can be modified independent of a low-level configuration setting.

18. The method of claim 17, wherein constructing a component register with entries with lists of capabilities of digital media components accessible to the computer-based processing device comprises registering a digital media component.

19. The method of claim 17, wherein the component register comprises an entry for a plurality of digital media components registered with the computer-based processing device, wherein each entry comprises:
- a first data field that identifies the digital media component;
- one or more groups of fields, where
  - a data field that identifies a function performed by the digital media component; and
  - another data field that identifies one or more operational parameters with an associated function identified in the first data field in the group.

20. The method of claim 19, wherein the data fields are logically linked or stored in a common data structure.

21. The method of claim 17, further comprising constructing a profile register comprising at least one extensible profile representing a digital media function.

22. The method of claim 21, wherein searching the component register for a component capable of providing the requested service comprises:
- mapping the requested service onto the profile register to select an extensible profile corresponding to the service; and
- mapping the selected extensible profile onto the component register to select one or more digital media components capable of providing the requested service.

23. The method of claim 17, further comprising instantiating the selected one or more components.

24. The method of claim 23, further comprising connecting the one or more instantiated components to other digital media components to form a device that performs a series of digital media tasks.

25. A method of assembling a topology of digital media components on a computer-based processing device, comprising:
- reading lists of capabilities from a profile register wherein the profile register comprises at least one extensible profile, wherein at least one extensible profile is a fixed list of configuration settings that accomplish a selected task;
- searching a component register for entries containing the capabilities indicated in the profile register; and
- rejecting components that lack the capabilities indicated in the profile register, or that have capabilities incompatible with the capabilities in the profile register,
- wherein the profile register determines which components are needed for a selected task requested by an application,
- wherein the profile register may be updated or modified without modifying the application, and
- wherein at least one capability is stored as a registry subkey that is implemented as a ratio quantity or a numerical pair that represent pairs of values wherein control identifiers for controlling one or more devices correspond to the fixed list of configuration settings which have a defined dependency ordering that can be expressed as a directed acyclic dependency graph, wherein the fixed list of configuration settings are structured such that changing a parameter causes a component to reconfigure one or more dependent settings, and high-level configuration settings can be modified independent of a low-level configuration setting.

26. The method of claim 25 further comprising:
- instantiating one or more components; and
- attempting to apply an extensible profile configuration to the instantiated component.

27. The method of claim 26, further comprising:
- searching for additional components in the component register if the attempt to apply a extensible profile configuration to the instantiated component fails; and
- rejecting components that have capabilities incompatible with the capabilities in the profile register.

28. The method of claim 25, further comprising merging the extensible profiles's capability list with additional capabilities from a user or an application used in the search process.

29. The method of claim 28, wherein the additional capabilities include a vendor identification or certification identification.

30. A method of assembling and configuring a topology of digital media components on a computer-based processing device, comprising:
- using a profile structure and one or more associated capability lists to select a component;
- instantiating the selected component via an Application Programming Interface (API);
- applying the profile structure to the selected component; and
- logically connecting the component to one or more additional components,
- wherein the profile structure may be updated or modified without modifying a requesting application, and
- wherein at least one capability is stored as a registry subkey that is implemented as a ratio quantity or a numerical pair that represent pairs of values; wherein the profile structure comprises a field that includes a list of mandatory settings; and wherein applying an extensible profile to the selected component comprises generating a signal if the selected component cannot implement a mandatory setting.

31. The method of claim 30, wherein an application uses the signal to determine whether the extensible profile structure was implemented successfully.

32. A method of configuring a topology of encoding and multiplexing digital media components on a computer-based processing device, comprising:
- searching an extensible profile for a multiplexer subprofile configuration, wherein the extensible profile is a fixed list of configuration settings;
- searching a component register for a multiplexer object compatible with the multiplexer subprofile;
- instantiating a multiplexer;
- configuring the multiplexer by applying the subprofile configuration settings using an interface API;
- connecting the multiplexer to an output of a content source, and, for each input stream of the multiplexer:
- searching the extensible profile for an encoder subprofile;
- searching the component register for a multiplexer object compatible with the subprofile;
- configuring the encoder by applying the subprofile configuration settings using an interface API; and
- connecting the encoder to the multiplexer,
- wherein the extensible profile determines which multiplexer objects are compatible with the multiplexer subprofile information,
- wherein the extensible profile may be updated or modified without modifying a requesting application; and
- wherein control identifiers used by the API for controlling one or more devices correspond to the fixed list of configuration settings which have a defined dependency ordering that can be expressed as a directed acyclic dependency graph.

* * * * *